United States Patent [19]

Sonoyama et al.

[11] 3,966,677
[45] June 29, 1976

[54] SELF-EXTINGUISHING POLYSTYRENE RESIN COMPOSITION

[75] Inventors: Yuzo Sonoyama; Akira Ohi; Yukio Hozumi, all of Sakai, Japan

[73] Assignee: Daicel Ltd., Osaka, Japan

[22] Filed: Sept. 6, 1974

[21] Appl. No.: 503,634

[30] Foreign Application Priority Data
Sept. 14, 1973 Japan.............................. 48-104191

[52] U.S. Cl...................... 260/45.85 T; 260/45.7 P
[51] Int. Cl.$^2$......................................... C08J 3/20
[58] Field of Search................ 260/45.7 P, 45.85 T, 260/45.75 B

[56] References Cited
UNITED STATES PATENTS

| | | | |
|---|---|---|---|
| 3,639,506 | 2/1972 | Haaf ................................. | 260/45.7 |
| 3,688,001 | 8/1972 | Exner et al. ....................... | 260/463 |
| 3,846,469 | 11/1974 | Gunsher et al. .................... | 260/463 |
| 3,855,277 | 12/1974 | Fox .............................. | 260/45.75 B |

OTHER PUBLICATIONS

The Chemistry and Uses of Fire Retardants – by Lyons, 1970, pp. 320 to 328.

*Primary Examiner*—V. P. Hokc
*Attorney, Agent, or Firm*—Woodhams, Blanchard and Flynn

[57] ABSTRACT

A polystyrene resin composition is prepared by adding to polystyrene resin, a mixture of (a) tricresyl phosphate and/or triphenyl phosphate and (b) a carbonate oligomer of 2,2-(4-4'-dihydroxy-3,3,',5,5'-tetrabromodiphenyl) propane which is terminated at its ends with a monofunctional phenol. These compounds are mixed with the oligomer in a selected mole ratio. The resin composition is self-extinguishing and possesses excellent thermal resistance, without diminution of the other original desireable properties of the resin.

7 Claims, 1 Drawing Figure

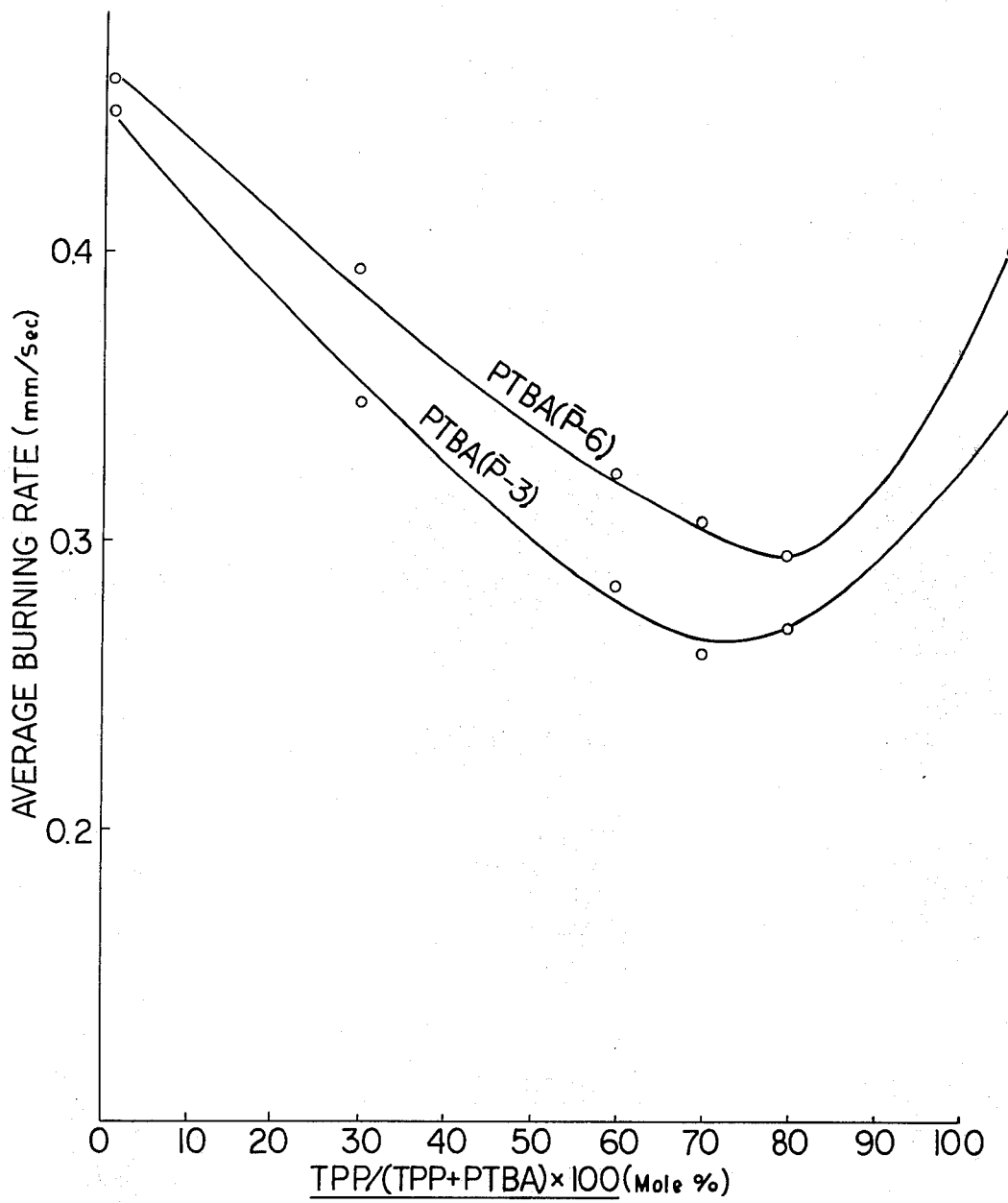

SELF-EXTINGUISHING POLYSTYRENE RESIN COMPOSITION

BACKGROUND OF THE INVENTION

1. Field of the Invention

This invention relates to polystyrene resin compositions which possess excellent self-extinguishing properties, as well as thermal resistance. The term "self-extinguishing" means that the resin composition burns for a limited time after removal of a test flame, but the resin does not support combustion and it self-extinguishes soon after the flame is removed.

2. Description of the Prior Art

Polystyrene resin compositions, because of their many excellent characteristics, are used in various fields in large quantities. On the other hand, because of their ease of combustion, these polystyrene compositions cannot be said to be the best material for use when non-flammability is an essential requirement. In fact, polystyrene resin compositions are unsuitable for making parts of electric appliances or business machines, because the parts may burn and cause serious trouble.

Further, the prior polystyrene resin compositions, when molded into foamed products, will have the foregoing disadvantages of being readily combustible so magnified as to prohibit their use as construction materials, even though they are very excellent in their thermal insulation and sound-absorbing properties.

A variety of methods have been proposed for eliminating the foregoing disadvantages and to confer a fire-retardant characteristic on polystyrene resin compositions. For instance, it has been suggested that the addition of one or more of such additives as a halogen-containing compound, a phorphorus-containing compound and antimony trioxide, is effective in imparting fire-retardancy to polystyrene resin compositions, and that these substances can be blended with polystyrene resins or mixed in advance with styrene monomer or styrene mixed monomers and then polymerized. Further, it has also been published that a halogen-, or phosphorus-containing monomer is synthesized and then copolymerized with styrene monomer to form directly fire-retardant polystyrene resin compositions.

The troubles involved in these prior methods, however, are that the resulting resin compositions have decreased impact-resistance and they also soften at lower temperatures, so that they must be extruded or molded only under a controlled narrow range of temperature. Consequently, if the temperature control should go wrong, the above additive compounds are apt to partially decompose to produce colored pellets and molded products, or to degrade to become lower in their fire-retarding effect. Also, if these additive compounds which are very expensive are added in a sufficiently large amount as to confer a good fire-retarding effect on polystyrene resin compositions, then the finished products themselves are high in cost and inferior in their mechanical properties.

Under these circumstances, in order to produce new resin compositions completely free of the foregoing defects, efforts have so far been directed toward discovering methods and agents capable of conferring a good flame-retarding property on polystyrene resin compositions.

Fire-retardant agents merely containing higher contents of halogen or phosphorus, however, do not always confer greater fire retardance on polystyrene resin compositions. Moreover, the resulting products which simply contain a larger quantity of halogen or phosphorus are not necessarily higher in fire retardance. The agents further vary in their fire-retarding effect when they differ in molecular structure, even though the atoms constituting the agents are the same in number and type. Therefore, it is very dificult to estimate in advance the possible fire-retarding effect of specific agents. In other words, various combinations of different fire-retarding agents or of the agents with other additives might produce a fire-retarding effect, but the determination of ideal combinations of agents is extremely difficult.

We previously found that a mixture of (a) tricresyl phosphate (TCP) and/or triphenyl phosphate (TPP) with (b) tetrabromobisphenol A (TBA), added in an equimolar mixture of (a) and (b), provides surprisingly excellent fire-retardance, as described in U.S. patent application Ser. No. 394,690, now U.S. Pat. No. 3,879,345 filed Sept. 6, 1973, the entire contents of which are incorporated herein by reference.

In our prior invention, if TBA oligomer is used, instead of TBA monomer, in equimolar mixture with (a) TCP and/or TPP, and regarding each of the TBA moieties which constitute the oligomer as one unit for the purpose of the molar ratio calculation, a great fire-retarding effect is conferred on the resulting resin composition and the composition is markedly improved in thermal resistance as well.

SUMMARY OF THE INVENTION

According to this invention, a polystyrene resin composition possessing excellent self-extinguishing property is obtained by adding thereto a mixture of:

a. tricresyl phosphate (TCP) and/or triphenyl phosphate (TPP), and b. a carbonate oligomer (PTBA) (average degree of polymerization $\bar{P} = 2$ to 10) of 2,2 -4,4'-dihydroxy- 3,3', 5,5'-tetrabromodiphenyl) propane terminated at the ends of the molecule with monofunctional phenol groups.

The molar ratio of (a) : (b) in the aforesaid mixture of (a) plus (b) is in the range of $$\frac{(a)}{(b)} = \frac{8 \times [\text{degree of polymerization } (\bar{P}) \text{ of } (b)]}{2}$$

$$\text{to } \frac{1 \times [\text{degree of polymerization } (\bar{P}) \text{ of } (b)]}{9}$$

This is equivalent to a molar ratio of (a):(b') = 8:2 to 1:9, wherein (b') is the sum of the number of moles of the individual monomer units of oligomer (b). For example, if the oligomer (b) has a degree of polymerization of 4, i.e., it consists of 4 monomer units in the molecule, then $$\frac{(a)}{(b)} = \text{from}$$

$$\frac{8 \times 4}{2} \text{ to } \frac{1 \times 4}{9} \left[ \frac{\text{moles of } (a)}{\text{total moles of monomer units of } (b)} \right].$$

The amount of the mixture of (a) plus (b) added to the polystyrene composition is such that the resulting composition contains at least 3 percent by weight of a mixture containing equal numbers of (1) moles of (a) and (2) moles of monomer units of oligomer (b). Stated in different terms, the minimum amounts of (a)

and (b) present in the resin composition are such that the following two equations (1) and (2) are satisfied.

Let X = minimum weight of TCP, TPP or mixtures thereof (a).

Let Y = minimum weight of PTBA (b).

Equation (1): $\dfrac{X}{\text{Mol. Wt. of }(a)} = \dfrac{Y}{\text{Mol. Wt. of monomer units of }(b)} = \dfrac{Y}{\dfrac{\text{Mol. Wt. of oligomer }(b)}{\overline{P}}}$ Equation (2): $X + Y = 3$ weight percent, based on the polystyrene resin We have discovered that when (a) TCP and/or TPP, mixed with (b) a polycarbonate oligomer (PTBA), is incorporated in a polystyrene resin composition, there is obtained an unexpectedly excellent fire-retarding effect for the resulting resin compositions. In addition, we have discovered that the mechanical properties of the resin are not significantly reduced by the addition of these fire retarding agents, and moreover, the thermal resistance is improved to a surprising extent.

The foregoing PTBA has an average degree of polymerization of from 2 to 10 and the terminal groups of the molecule are monofunctional phenols. It has the following formula:

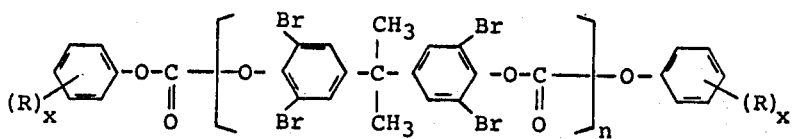

wherein R is hydrogen or alkyl group of from 1 to 6 carbon atoms, X is an integer from 1 to 5 and n is an integer of 2 to 10.

When TCP or TPP is added alone in a large amount of up to 20 percent by weight to polystyrene resin, the resulting resin composition does not possess any substantial self-extinguishing property. PTBA alone must be added to the extent of at least about 10 percent by weight to obtain a self-extinguishing property. Further, when these compounds of TCP, TPP and PTBA are individually added in amounts larger than those described above, the properties of the resin composition will be impaired so as to make it of no practical use.

When (a) TCP and/or TPP is mixed with (b) PTBA, in the mole ratio of $$\dfrac{\text{moles of }(a)}{\text{total moles of monomer units of oligomer }(b)} = \text{from } \dfrac{8}{2} \text{ to } \dfrac{1}{9},$$

and wherein at least 3 percent by weight, based on the weight of the polystryene resin, of the additive mixture consists of equal numbers of (1) moles of (a) and (2) moles of monomer units of oligomer (b), the flammability of the resin is greatly reduced. Further, when there is added an additive mixture supplying at least 8 percent by weight of a mixture of equal numbers of (1) moles of (a) and (2) moles of monomer units of oligomer (b), self-extinguishing qualities are conferred on the resin. Also, in order to give a higher degree of self-extinguishing properties, the amount of additive mixture added to the resin composition can be increased. For example, the addition of about 10 percent by weight of the equimolar additive mixture can give resin compositions which meet the fire retardance requirements for SE-II class regulation of the Underwriter's Laboratory Standard.

Although the use of said two additive compounds (a) and (b) in an equimolar mixture exhibits the most efficient flame retarding effect, the synergistic effect can be obtained by using them in a molar ratio of (TCP and/or TPP/ (PTBA) = $8 \times \overline{P}/2$ to $1 \times \overline{P}/9$ preferably $6 \times \overline{P}/4$ to $2 \times \overline{P}/8$.

When the mole ratio of the two additive components is different from the equimolar ratio of 1/1, the sum of the weights of the component present in minor amount and the equimolar amount of the other component (i.e. the weight of an equimolar mixture of the two components) must be at least 3 weight percent based on the resin. The total amount of the two additive compounds is not more than 25 weight percent, based on the resin. It will be observed that there can be added to the resin an excess of one of (a) or (b), that is, more than is needed to make an equimolar mixture of (a) plus (b), provided that the molar ratio of a/b is from $(8 \times \overline{P})/2$ to $(1 \times \overline{P})/9$, as defined above.

The foregoing mixtures employing PTBA give the same effects as those obtained using TBA, in conferring the self-extinguishing characteristic on polystyrene resin compositions. However, the PTBA mixtures produce a more marked effect than TBA mixtures in improving the heat resistance of the resin composition, while maintaining its self-extinguishing properties as well.

It is not known at present why the complex fire-retarding agents composed of (a) TCP and/or TPP and (b) PTBA, exert an outstanding synergistic effect in conferring fire retardancy on polystyrene resin compositions. Presumably the synergistic effect might stem from the effect of phosphorus and bromine which coexist in the agents, the adaptability of the agents in terms of chemical structures to the polystyrene resin composition and the presence of aromatic rings in each component which constitutes the agents.

Further, the improvement in the thermal properties of the resin composition obtained by using PTBA seems to derive from the fact that the TBA monomer units of the PTBA combine with each other to form molecular chains which eventually develop into high molecular chains, inhibiting the resin composition from degrading when heated.

Tricresyl phosphate (TCP) used in this invention has a chemical formula of $(CH_3C_6H_4O)_3PO$, a molecular weight 368.36, and a boiling point 275°–280°C/20 mm Hg. It is a colorless and odorless liquid synthesized in known manner from cresol and phosphorus oxychloride.

Triphenyl phosphate (TTP) used in this invention has a chemical formula of $(C_6H_5O)_3PO$, a molecular weight 326.28, and a melting point 49°–50°C. It is a white crystalline flaky material made from phenol and phosphorus oxychloride in known manner.

PTBA, a carbonate oligomer of TBA, used in this invention can be prepared by the same method which is generally used in synthesizing polycarbonates by the reaction of bisphenol A with phosgene. One example of the method is disclosed in Japanese patent publication No. 47-44537.

That is, tetrabromo bisphenol A and the monofunctional phenol for terminal closure are dissolved in methylene chloride. Phosgene is introduced into the mixture, whose pH is kept at 11 to 12 by constant addition of 10 percent caustic soda and whose temperature is maintained at about 25°C, and then trimethylamine solution in water, as a catalyst, is poured in. The mixture is allowed to stand for 1 hour. Thereafter, the methylene chloride layer contained in the mixture is washed with water, and then in heated with water which is further added to remove the methylene chloride. The resulting product is a white powder. The monofunctional phenols used are those which are generally applied in synthesizing polycarbonates, such as phenol, p-tert.-butylphenol, and other lower alkyl phenols.

Both TCP and TPP are widely used as internal plasticizers or lubricants for plastics. PTBA is applied, for instance, as a fire-retardant, as shown in Japanese patent laid-open application No. 52834/1973.

The polystyrene resins usable in the present invention include homopolymers of styrene and styrene derivatives and copolymers thereof with other copolymerizable monomers, said copolymers containing at least about 40 weight percent of styrene or styrene derivatives. For example, there can be employed polymers of styrene per se and styrene derivatives such as α-substituted styrene, for example, α-methylstyrene, vinyltoluene and o-chlorostyrene; interpolymers of those monomers are predominant component and one or more copolymerizable monomers such as vinyl compounds, for example, acrylonitrile, acrylic acid, methacrylic acid and methyl or ethyl esters of them, vinyl heterocyclic compounds such as vinylpyridine and vinylcarbazole, and conjugated diene compounds such as butadiene and isoprene; and thermoplastic resin compositions substantially comprising said polymers as main components. Such polymers are well known materials of commerce and need not be described in detail herein. As is shown by the following Examples such material as high-impact polystyrene and acrylonitrile-butadiene-styrene resins can be employed in the invention. The term "polystyrene resin" employed herein includes all of these well known materials.

In adding TCP and/or TPP and PTBA to polystyrene resin, care should be paid to the ratio and the amount of these compounds so as to increase the fire-retarding properties of the resin, but not to decrease its mechanical properties.

In principle, it is most desirable to mix (a) TCP and/or TPP with (b) PTBA, in the mole ratio of $a/b = 1(\bar{P})/1$ because this ratio is highly effective in conferring fire-retardancy on polystyrene resin compositions. However, the mole ratio of a/b capable of producing the synergistic effect and consequently the fire-retarding effect is from $8(\bar{P})/2$ to $1(\bar{P})/9$, preferably from $6(\bar{P})/4$ to $2(\bar{P})/8$. Each of these combinations (TCP and/or TPP mixed with PTBA) prepared in the mole ratio of $1(\bar{P})/1$ should be more than 3 percent by weight based on the weight of the resin composition. Further, it is important that each of these combinations, when applied within the allowable ratios above, should be more than 3 percent by weight, not in terms of its total amount added, but rather in terms of that portion of the combination which has a molar ratio of $a/b = 1(\bar{P})/1$.

For example, when (a) TPP and (b) PTBA are mixed in the mole ratio a/b of $6\bar{P}/4$, and $\bar{P}$ is 3, then at least about 3.5 percent by weight of the mixture is added to polystyrene resin.

The ratio of TCP and/or TPP to PTBA depends upon the type of polystyrene resin. Generally, imparting a fire-retardant property to polyolefin and vinyl polymers is far more difficult as compared with cellulose, polyester and polyurethane which burn to produce carbide. Among the polystyrene polymers above, those polymers of high-impact polystyrene or ABS resin which contain a diene elastomer are so difficult to provide with fire-retardancy that they are, in many cases, blended with such fire-retardant resins as polyvinyl chloride, polyethylene chloride and polycarbonate.

Therefore, in order to confer satisfactory fire-retardancy on polystyrene resin which contains a diene elastomer, an increased amount of PTBA mixed with TCP and/or TPP should be added.

Mixtures of TCP and/or TPP and PTBA can be used without any limit in amount in conferring fire-retardancy on polystyrene resins, but the total amount of the mixture of additives should be less than 25 percent, preferably 20 percent by weight, based on the resin in order to maintain the desired mechanical properties of the polystyrene resin composition.

There are a variety of methods available of incorporating mixtures of TCP and/or TPP and PTBA with polystyrene resin. The incorporation can be effected by employing generally used homogenizing machines such as heated rollers, Banbury mixers, and extruders. The additive compounds (TCP, TPP and PTBA), because of their excellent compatibility with polystyrene resin, can be readily blended with the resin.

In addition, TCP and/or TPP can be dissolved in monomers used to make the polystyrene polymer and then the resulting solution can be polymerized in a conventional polymerization system. To the polystyrene thus produced, PTBA is blended, using any of the foregoing machines. By this process, TCP and/or TPP can be completely or in molecular form dispersed in the resin composition finally produced. As a result, it is possible to impart to the resin composition, greatly improved fire-retardancy.

The addition of TCP and/or TPP into the polymerization system, however, is not desirable from the process standpoint, because it causes such adverse phenomena as a reduction in the polymerization rate and a decrease in the molecular weight of polystyrene resin.

Conventional resin additives such as plasticizers, lubricants, agents for preventing thermal deterioration and ultraviolet ray absorbing agents can be used in the composition without detrimental effects, because TCP, TPP and PTBA are chemically stable compounds.

The flame-retarding agent composed of a mixture of (a) TCP and/or TPP and (b) PTBA used in this invention has an excellent effect. The resulting resin composition is greatly improved in its flame-retardancy, and on the other hand, the other original properties of the resin are not greatly reduced. Accordingly, the foregoing agents can be used in polystyrene resin compositions which are used widely in molding products which require high flame-retardant characteristics.

The remarkably excellent properties achieved by these complex flame-retarding agents according to this invention are illustrated by, but are not limited to, the following Comparison Examples and Examples according to the invention. The term "parts" in the Comparison Examples and Examples means parts by weight per 100 parts by weight of the resin composition.

BRIEF DESCRIPTION OF THE DRAWING

The drawing is a graph of average burning rate (mm/sec) versus the molar percent of TPP to TPP+PTBA for the tests described in Comparison Example 1.

COMPARISON EXAMPLE 1

Eight parts of TPP and PTBA were blended with pellets of ABS resin which has a medium impact strength, and which contains 10 percent by weight of butadiene rubber. That is, these substances were mixed uniformly in a 10-liter blender of the V-type for about 15 minutes, and then pelletized by a monoaxial extruder equipped with a screw of the full-flight type. The pellets were molded into test pieces by a molder of 4-ounce capacity. Five test pieces were examined in terms of burning rate, and the results are indicated in detail in Tables 2 and 3.

The properties of the PTBA used in the foregoing tests are shown in Table 1.

Table 1

|  | PTBA ($\bar{P} = 3$) | PTBA ($\bar{P} = 6$) |
|---|---|---|
| Melting Point 1) m.p. | $\geq 180°C$ | $\geq 230°C$ |
| Intrinsic Viscosity 2) [$\eta$] | 0.042 | 0.071 |
| Number Average Molecular Weight 3) Mn | 1920 | 3510 |

1 The melting point was determined by a melting point apparatus at the heat-up speed of 2°C/min.

2. The intrinsic viscosity was determined by an Ubbelohde's viscometer on samples dissolved in 100 ml of methylene chloride.

3. The number average molecular weight was determined by the vapor pressure equilibrium method, using a molecular weight determining apparatus. In this method, chloroform was used as a solvent.

Table 2

| TPP/TPP+PTBA ($\bar{P}=3$) (molar ratio) × 100 | Test Piece No.; Burning Rate | | | | | Average Burning Rate (mm/sec) |
|---|---|---|---|---|---|---|
|  | 1 | 2 | 3 | 4 | 5 |  |
| 100 | 127/333 (0.381) | 127/353 (0.360) | 127/363 (0.350) | 127/407 (0.312) | 127/362 (0.351) | 0.351 |
| 80 | 70/264 (0.265) (0.282) | 85/301 (0.282) | 88/312 (0.251) | 72/287 (0.277) | 80/289 | 0.271 |
| 70 | 59/231 (0.255) | 64/229 (0.280) | 51/209 (0.244) | 62/240 (0.258) | 73/256 (0.285) | 0.264 |
| 60 | 102/364 (0.280) | 68/239 (0.284) | 73/251 (0.291) | 84/285 (0.295) | 79/281 (0.281) | 0.286 |
| 30 | 127/367 (0.346) | 127/364 (0.349) | 127/345 (0.368) | 127/363 (0.350) | 127/384 (0.331) | 0.349 |
| 0 | 127/282 (0.450) | 127/302 (0.420) | 127/288 (0.441) | 127/273 (0.466) | 127/274 (0.464) | 0.448 |

Table 3

| TPP/TPP+PTBA ($\bar{P}=6$) (molar ratio) × 100 | Test Piece No.; Burning Rate | | | | | Average Burning Rate (mm/sec) |
|---|---|---|---|---|---|---|
|  | 1 | 2 | 3 | 4 | 5 |  |
| 100 | 127/327 (0.388) | 127/320 (0.397) | 127/308 (0.413) | 127/316 (0.402) | 127/314 (0.405) | 0.401 |
| 80 | 61/310 (0.290) | 72/242 (0.297) | 80/261 (0.306) | 65/213 (0.305) | 57/203 (0.280) | 0.296 |
| 70 | 64/203 (0.315) | 57/179 (0.318) | 50/170 (0.294) | 84/287 (0.293) | 90/287 (0.314) | 0.307 |
| 60 | 68/210 (0.324) | 127/385 (0.330) | 80/252 (0.317) | 127/383 (0.332) | 94/295 (0.316) | 0.324 |
| 50 | 127/326 (0.390) | 127/317 (0.401) | 127/324 (0.392) | 127/310 (0.410) | 127/332 (0.382) | 0.395 |
| 0 | 127/274 (0.464) | 127/281 (0.452) | 127/283 (0.448) | 127/270 (0.471) | 127/276 (0.460) | 0.459 |

The relation between the mole ratio of TPP/(TPP+PTBA) and the average burning rate shown in Tables 2 and 3 is also illustrated in the drawing.

The burning rate is the quotient wherein the numerator is the distance (mm) burned and the denominator is the time (sec.) until the flame self-extinguishes. The average burning rate is the mean value of the five test pieces examined.

A mixture of TPP and PTBA in the mole ratio of $\bar{P}/1$ means a mixture of 3 moles of TPP and 1 mole of PTBA when $\bar{P}$ is 3.

As clearly shown in Tables 2, 3 and the drawing, of the various mixing ratios of PTBA and TPP, there is a ratio which provides the lowest burning rate. This lowest rate occurs between 70 and 80 mole percent of TPP when $\bar{P}$ of PTBA is 3, and between 80 and 90 mole percent of TPP when $\bar{P}$ is 6. This means that the mole ratio of TPP/PTBA is $\bar{P}/1$ or 3 to 1 when the $\bar{P}$ is 3, and accordingly TPP is 75 mole percent; similarly the ratio is $\bar{P}/1$ or 6 to 1 when $\bar{P}$ is 6, and accordingly TPP is 86 mole percent. These illustrate that the most effective fire-retardancy is obtained when TPP and PTBA are incorporated in the mole ratio of about $\bar{P}/1$.

COMPARISON EXAMPLE 2

A mixture of TBA and TPP and another mixture of PTBA and TPP were blended respectively with ABS resin as shown in Table 4. The ABS resin has a medium impact resistance and contains 5 percent by weight of butadiene rubber. Test pieces were then made from the resin conposition in the same way as described in Comparison Example 1, and the mechanical properties were determined by the ASTM test method and the self-extinguishing properties by UL Standard 94. The test results are shown in Table 4.

Table 4

| | | | | Experiment No. | | |
|---|---|---|---|---|---|---|
| | | | | 1 | 2 | 3 |
| Composition | ABS resin | | | 100 | 100 | 100 |
| | TPP | | | | 5 | 5 |
| | TBA | | | | 12 | |
| | PTBA ($\bar{P}=3$)* | | | | | 14 |
| | | ASTM Test Method | Units | | | |
| | Tensile strength | D 638 | Kg/cm² | 554 | 620 | 675 |
| | Tensile breaking elongation | D 638 | % | 24 | 10 | 13 |
| Mechanical | Impact strength | D 256 | Kgcm/cm | 7.3 | 4.6 | 4.3 |
| | Thermal deformation temperature | D 648 18.5 Kg/cm² | °C | 83 | 80.4 | 91.2 |
| properties | Bending strength at yield | D 790 | Kg/cm² | 960 | 1020 | 1030 |
| | Bending modulus | D 790 | Kg/cm² | 31,000 | 31,500 | 31,400 |
| | Self-extinguishing properties | No. UL-94 | | burning | SE-II | SE-II |

*The amount of TBA in PTBA ($\bar{P}=3$) was 84.6%, the TBA being a terminally closed phenol.

Table 4 shows that PTBA, when used instead of TBA, gives the same self-extinguishing characteristic as that of TBA to molded products, but remarkably improves the molded products in terms of heat-resistance and mechanical properties.

EXAMPLE 1

One hundred parts of polystyrene resin were blended with 2 parts of TPP and 4 parts of PTBA ($\bar{P}=3$) in a 10-liter blender of the V-type and then extruded into test pieces in the same manner as described in the Comparison Examples above. The test pieces, when examined according to UL-94 standard test, self-extinguished in 15 seconds on the average.

EXAMPLE 2

One hundred parts of high-impact polystyrene resin containing 10 percent by weight of rubber, 3 parts of TPP, and 8 parts of PTBA ($\bar{P}=3$) were made into test pieces, which then were tested for their self-extinguishing characteristic in the same way as described in Example 1. The test results showed that the pieces self-extinguished in 7.6 seconds on the average.

EXAMPLE 3

One hundred parts of AS resin containing 27 percent by weight of acrylonitrile, 4 parts of TPP and 6 parts of PTBA ($\bar{P}=6$) were made into test pieces, which then were tested for inflammability by the same method as shown in Example 1. The test pieces self-extinguished in 18 seconds on the average.

EXAMPLE 4

Four parts of TPP were completely dissolved in 70 parts of styrene, and the solution then was uniformly mixed with 30 parts of acrylonitrile, 0.25 part of lauroyl peroxide as a catalyst, and t-dodecyl mercaptan as a molecular weight regulator. The mixture was suspended in an aqueous medium, wherein 2 parts of calcium tertiary phosphate was dispersed in water, the amount of water being equal to the total amount of the monomers.

Then, the mixture was heated at a temperature which was maintained at the outset at 70°C for 7 hours and which was further raised gradually up to 85°C for more than 4 hours to complete the polymerization reaction. Thereafter, the calcium tertiary phosphate contained in the mixture was decomposed with hydrochloric acid, and then the mixture was washed with water, dehydrated, and dried to form a pearl-like polymer. Examination by gas chromatography confirmed that 3.8 percent by weight of TPP was contained in the polymer. The resulting resin thus produced and 6 parts of PTBA ($\bar{P}=3$) were molded into test pieces which were tested in terms of various properties in the same manner as described in Example 1. The results showed that these test pieces self-extinguished in 15 seconds on the average.

EXAMPLE 5

One hundred parts of ABS resin which contained 10 percent by weight of butadiene rubber, 5 parts of TPP, and 14 parts of PTBA ($\bar{P}=6$) were formed into test

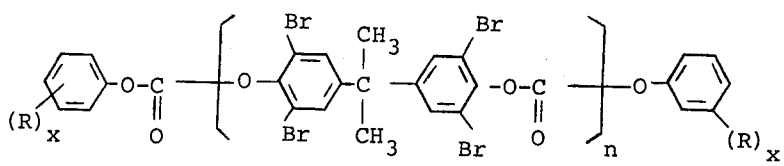

pieces, which then were tested in terms of various properties by the same method as mentioned in Example 1. The results indicated that the resulting resin composition self-extinguished in 10.2 seconds on the average.

EXAMPLE 6

The results obtained from using 4 parts of TCP instead of 4 parts of TPP (Example 3) showed that the resulting resin composition self-extinguished in 6.5 seconds on the average. All the other conditions were the same as that of Example 3.

EXAMPLE 7

The results which were obtained using 4 parts of TCP instead of 4 parts of TPP indicated that the resulting resin composition self-extinguished in 7.0 seconds on the average.

THe embodiments of the invention in which an exclusive property or privilege is claimed are defined as follows:

1. A self-extinguishing resin composition which comprises a homogeneous mixture of
   1. polystyrene resin, and
   2. flame retarding agent in an amount sufficient to impart a self-extinguishing property to the resin composition, said flame retarding agent consisting essentially of
      a. a material selected from the group consisting of tricresyl phosphate, triphenyl phosphate and mixtures thereof, and
      b. a carbonate oligomer of 2,2 -(-4,4'-dihydroxy-3,3', 5,5'-tetrabromodiphenyl) propane having the formula:

wherein R is hydrogen or alkyl having from 1 to 6 carbon atoms, $x$ is an integer of 1 to 5 and n is an integer of 2 to 10;

the molar ratio of ingredient (a) : ingredient (b) being about $1(n):1$, said resin composition containing from 3 to 25 percent by weight of said flame retarding agent.

2. A self-extinguishing resin composition according to claim 1 in which $n$ is 3 and said fire retarding agent contains from 70 to 80 mole percent of (a).

3. A self-extinguishing resin composition according to claim 1 in which $n$ is 6, and said fire retarding agent contains from 80 to 90 mole percent of (a).

4. A self-extinguishing resin composition according to claim 1, in which the total amount of flame-retarding agent does not exceed 20 percent by weight, based on the total weight of the resin composition.

5. A self-extinguishing resin composition according to claim 1, in which the flame-retarding agent is blended in the polystyrene resin.

6. A self-extinguishing resin composition according to claim 1, in which the ingredient (a) is added during polymerization of the polystyrene resin and ingredient (b) is blended in the resin after polymerization is completed.

7. A self-extinguishing resin composition according to claim 1, wherein the polystyrene resin is a member of the group consisting of polymers of (1) styrene, (2) $\alpha$-alkyl-substituted styrene, (3) nuclear substituted styrene; and copolymers of (1), (2) or (3) with at least one member of the group consisting of vinyl compounds and conjugated dialkene compounds.

* * * * *